United States Patent [19]

Bennett

[11] 4,417,601

[45] Nov. 29, 1983

[54] VARIABLE PROPORTIONING VALVE FOR BALANCED PRESSURE PROPORTIONING SYSTEMS, AND SYSTEM CONTAINING THE VALVE

[75] Inventor: Robert W. Bennett, Downingtown, Pa.

[73] Assignee: National Foam Systems, Inc., Lionville, Pa.

[21] Appl. No.: 218,066

[22] Filed: Dec. 19, 1980

[51] Int. Cl.³ .......................... F16K 1/04; F16K 1/12
[52] U.S. Cl. ............................... 137/556.6; 251/122; 251/215; 251/218
[58] Field of Search .................. 137/556.6; 251/122, 251/215, 218–225, 227

[56] References Cited

U.S. PATENT DOCUMENTS

| 1,681,981 | 8/1928 | Gilbert | 251/215 |
| 2,958,504 | 11/1960 | Lindgren | 251/227 X |
| 2,989,075 | 6/1961 | Johnston | 251/225 X |
| 3,090,423 | 5/1963 | Garner | 251/122 X |
| 3,365,166 | 1/1968 | Smith | 251/122 X |

FOREIGN PATENT DOCUMENTS

| 738323 | 12/1932 | France | 251/218 |
| 748998 | 7/1933 | France | 251/218 |
| 1100584 | 1/1968 | United Kingdom | 251/215 |

*Primary Examiner*—Robert G. Nilson
*Attorney, Agent, or Firm*—Eugene E. Renz, Jr.

[57] ABSTRACT

A novel variable proportioning valve for balanced pressure proportioning systems and variable liquid proportioning system incorporating such a valve. The valve is adjustably operable in a system to proportion or meter two liquids, for example, at constant pre-selected percentages with a resultant substantially constant or fixed ratio of the liquids even under varying flow conditions. The principles can be used with different and additional fluids. The variable proportioning valve incorporates in the body thereof a flow control plug coacting with an outlet port to control net outlet flow, and the plug is capable of having such configurations and sizes whereby relative motion between the valve plug and the port can provide a wide range of flow outputs of different specific characteristics. The valve has a construction permitting ease of disassembly for valve plug removal and replacement for purposes of repair, or for altering the operating characteristics of the valve, and therefore, that of the system. The present invention while particularly useful in conjunction with firefighting systems of a type utilizing a foam mixture for fire control, for example, is also desireably useful for hazardous chemical spill control, for dust control such as may occur in coal mines, and for other manifest uses.

5 Claims, 8 Drawing Figures

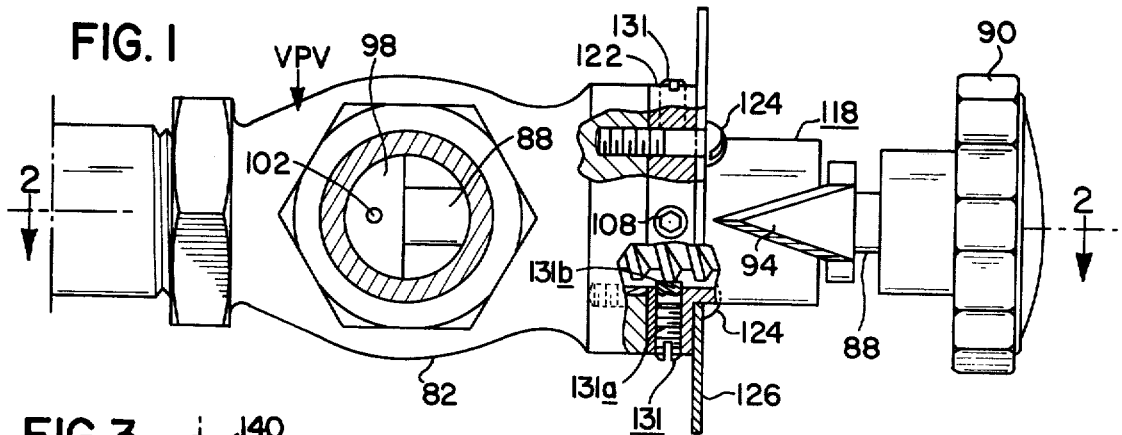
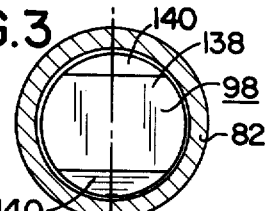
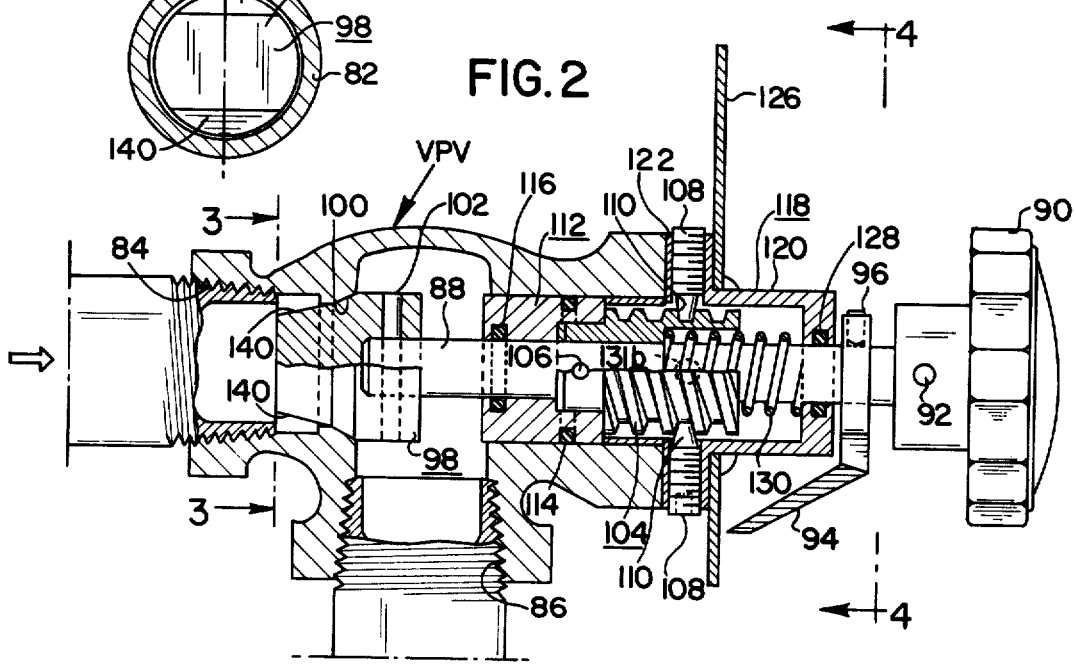
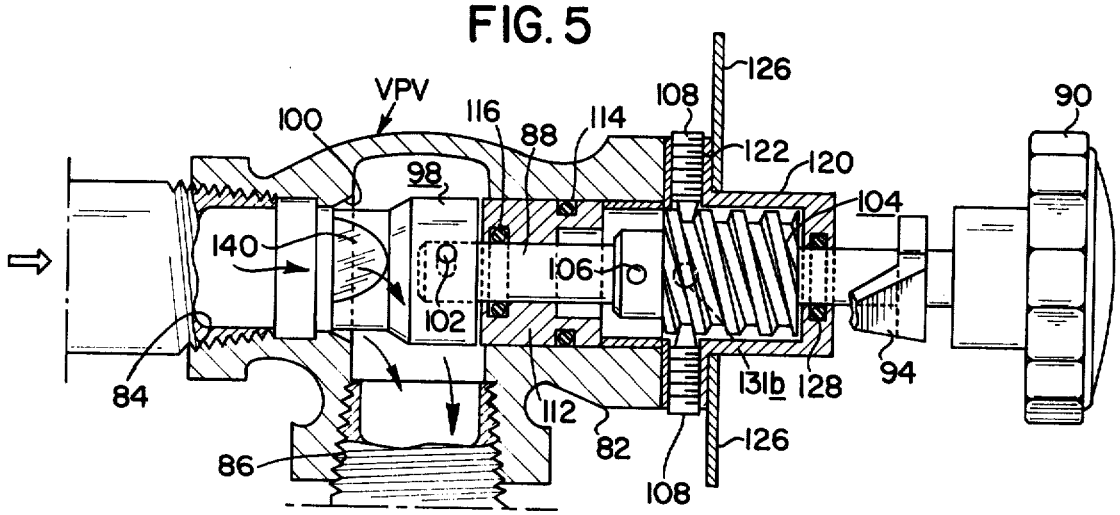

VARIABLE PROPORTIONING VALVE FOR BALANCED PRESSURE PROPORTIONING SYSTEMS, AND SYSTEM CONTAINING THE VALVE

BACKGROUND OF THE INVENTION

The present invention relates to a particular variable proportioning valve designed to proportion or meter two different liquids at constant pre-selected percentages under varying flow conditions.

The present invention is particularly useful in admixing or providing a foam solution wherein a foam liquid, or foam liquid forming solution or material, is admixed with water from a source such as a water hydrant, or a reservoir of the like, and wherein the output mixture will have a predetermined proportion of material or ratios for use in a foam-water fire fighting system. Other obvious uses for the invention and components thereof will appear hereinafter.

Apparatus and a system for plural fluid proportioning of the type in question, and particularly foam-water fire fighting systems wherein the demand for the foam-water mixture can be expected to vary considerably, is generally disclosed for example in prior U.S. Pat. No. 4,064,891.

Examples of valving apparatus used for admixing, or controlling the mixing of two liquid materials, exist in the prior art. Such prior art devices, apparatus and structures, however, have, in some instances, been of such complex structure and/or configuration as not only to reduce reliability of proportioning accuracy, but additionally create a problem of control, and/or repair, or modification of the apparatus to provide ultimately specifically different end flow discharges of two mixed fluids.

Of substantial significance for use in such systems is the new and novel variable proportioning valve of the invention. The valve is controllable to proportion or meter two liquids at constant pre-selected percentages, so that the output mixture of these two liquids, subsequent to being appropriately mixed, will remain in a pre-set cntrolled and constant ratio.

The novel valve incorporates, in a valve body, a flow control plug operable with a circular outlet port to determine the net flow area through which the liquid flows. The flow plug has a configuration whereby relative motion of the plug and the port varies the net outlet flow area.

The flow plug is provided with a seating surface of a nature which provides a means for complete flow shut-off through the valve.

The valve is of a structure permitting easy assembly and disassembly for removal of the plug for replacement of damaged plugs, and/or to incorporate in the valve plug bodies having specifically different configurations, and thereby serving to vary the output characteristics of the valve.

The valve is of a simple and yet highly efficient operating nature, and the various structural features thereof give improved operating characteristics.

The valve includes visual indicating means by which a user can pre-set the valve in order to vary the desired percentages or ratio of mixed liquids, and the setting is visually easily ascertainable through incorporation of a pointer and indicator plate showing a precise set angular position of the valve. This permits the valve to be quickly and accurately set to meet the desired conditions of use. Accurate setting of the valve to other desired percentages or ratios of mixed liquids can be readily accomplished during and under system flow conditions.

The valve structure incorporates means for varying the position of the flow plug, to vary the output flow therethrough, and uses a fast acting control for position of the plug to facilitate full opening of the valve in less than a 360° rotation of a control handle, and greter than a 300° rotation. The flow is infinitely variable from zero to maximum flow. The valve, generally speaking, is efficiently usable under high vibration environments and high inlet pressures, by use of dampening means serving to otherwise negate the tendency of these combined factors to cause the valve to go to the full open position; is lockable in any desired control position for the predetermined and pre-set output liquid ratio; can be used with corrosive liquids; provides readily attainable and repeatable positioning; visually accurately and easily indicates the valve setting position; permits all valve components to be removed from within the valve body without removal of the valve overall from the system; permits ready flow character alteration by change of the plug element; and generally results in a highly improved balanced proportioning system, with highly improved overall end results.

Additional advantages, objects and features of the invention will be more readily apparent from the following detailed description of an embodiment of the novel valve and a system incorporating the new valve structure.

BRIEF DESCRIPTION OF THE DRAWINGS

For purposes of illustrating a preferred form of the novel variable proportioning valve invention and a system usefully incorporating such a valve, the accompanying drawings include:

FIG. 1 is an enlarged bottom plan view of a variable proportioning valve according to the invention;

FIG. 2 is a longitudinal sectional view through the valve taken on lines 2—2 of FIG. 1;

FIG. 3 is a transverse sectional view taken on lines 3—3 of FIG. 2;

FIG. 5 is a view similar to FIG. 2 but showing the valve in a fully opened position;

DESCRIPTION OF THE PREFERRED EMBODIMENTS

Figure 8:
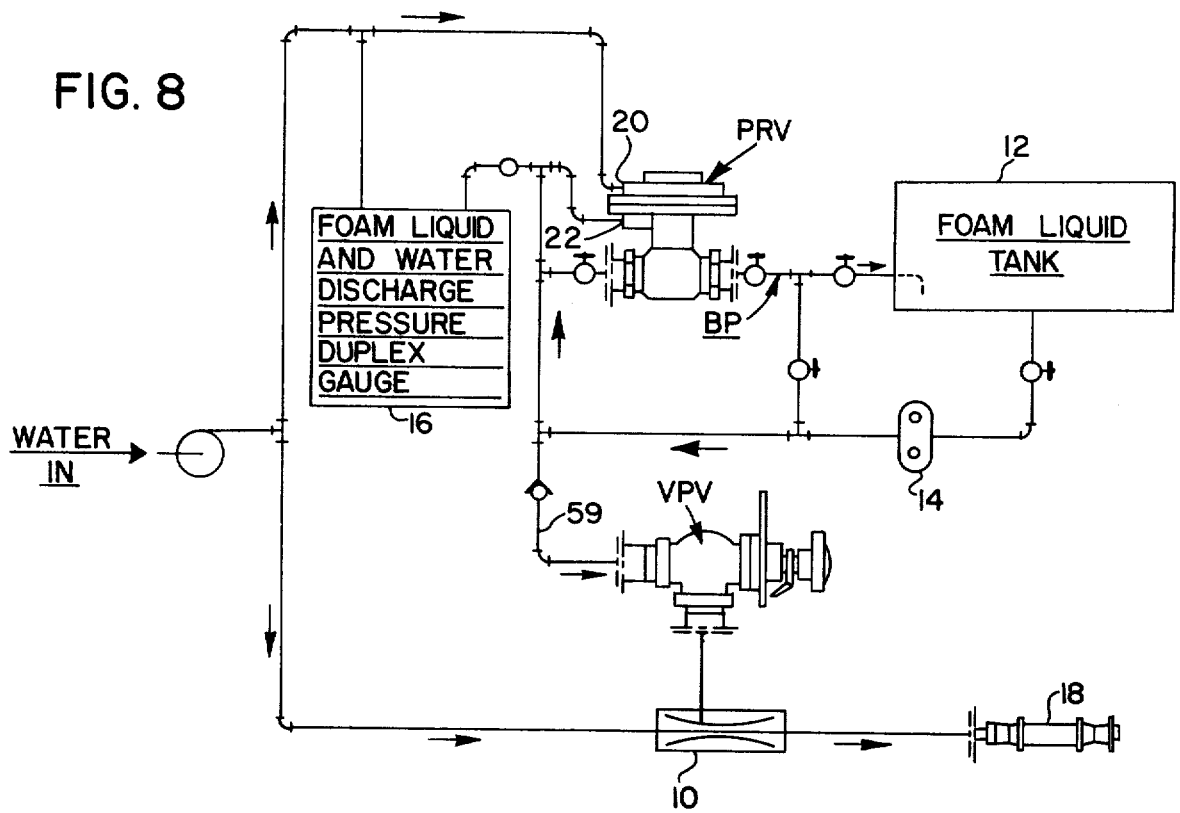
FIG. 8 is a schematic diagram of a balanced pressure proportioning system which utilizes a diaphragm valve, which incorporates in the system a novel variable proportioning valve of the present invention.

In order to illustrate a setting or system wherein the particular valve structure of the present invention is particularly suitable, and for illustrative purposes only, FIG. 8 shows a system particularly suited for the function of mixing and discharging of foam-water admixtures for fire fighting systems. It is obvious that the system can vary, and generally can be capable of specifically different uses, especially using the present valve.

Such a system will be broadly described with reference to a system as schematically shown in FIG. 8. This shows a typical system which can utilize the variable proportioning valve of the invention. The system as shown in FIG. 8 is a typical balanced pressure proportioning system comprised generally of a pressurized water source, not shown, a diaphragm pressure regulating valve PRV of a generally known type, a venturi-type differential pressure device 10, a foam liquid tank 12, a foam liquid pump 14, a foam liquid flow control valve VPV, a duplex pressure gauge 16 for monitoring water and foam liquid pressures and associated piping and valves. Material from the foam liquid tank is to be mixed with the water so as to always provide a substantially fixed ratio solution discharge from the system. The solution is generally discharged through one or more nozzles 18 or other devices under varying flow conditions.

In order to compensate for the varying flow conditions, the water pressure to the venturi device 10 (proportioner) is transmitted to a pressure indicator device, duplex gauge 16, and also to the diaphragm-type pressure regulating valve PRV. As the system flow varies, the water pressure also varies. This pressure variation is sensed, through a water sensing port 20, by the upper diaphragm compartment of the diaphragm valve, causing the valve to close with an increase in pressure and open with a decrease in pressure. The lower diaphragm compartment of the diaphragm valve PRV is connected to the foam liquid pump 14 discharge at port 22, and thereby senses foam liquid pressure at the foam liquid proportioning valve. Since the diaphragm pressure controls the liquid foam system pressure by by-passing excess foam liquid back to the foam tank, any variations in water pressure are automatically compensated for by the diaphragm valve PRV which adjusts the foam liquid pressure to balance the water pressure. The duplex gauge 16 monitors both water and foam liquid pressures and thereby indicates balanced pressures when indicating needles for each read the same. For manual operator balancing, the diaphragm valve PRV is isolated from the system by shut-off valves and pressures as indicated on the duplex gauge are then balanced by manual valve control using the variable pressure valve VPV of the invention. Since the proportioner water inlet pressure and the variable proportioning valve foam liquid pressure are balanced, i.e. have the same value, with the proportioner jet and proportioning valve discharging into a common chamber, the pressure differential for both devices is the same for all flow conditions.

Referring now in detail to the drawings, the present valve VPV consists of a valve body 82 having an inlet opening 84 connected to the end of line 59 which conveys liquid foam in the system, and an outlet end or opening 86 which leads the liquid foam passing through valve VPV to venturi mixing chamber 10. A Stem generally indicated at 88 is operatively associated and introduced into the open or hollow interior of the valve body and has connected at the exterior top thereof a control knob 90, attachable by a set screw or the like 92. The stem also carries thereon a pointer 94, or indicator arm, and which again incorporates a set screw 96. The lower end of stem 88 has, removably attached thereto, a plug generally indicated at 98 which cooperates or coacts with a valve seat 100 and functions to control the output through this valve. This valve plug 98 can assume different configurations, shapes and sizes, as will be hereinafter shown, and additionally is easily replaceable in the valve body if it becomes damaged through corrosion or other specific causes. To this end a retaining pin 102 passes through the valve plug, and interconnects in the lower end of valve stem 88.

The stem has incorporated and attached thereto a drive cam means which consists of a grooved barrel cam assembly indicated at 104, the function of which will be referred to hereinafter, and a roll pin 106 is placed below the cam section as shown in FIG. 2. Cam pins 108, in radially spaced positions, have bevelled or tapered points at 110 of such shape and size as to operatively engage in the grooves of the drive cam means 104 in tight engagement therewith. The radial spacing of, and function of, these pins and pointed ends is to eliminate undesired movements of the cam and to insure positive control. The profile of these pin ends is such as to fit tightly in the cam groove of cam 104 and the pins are so screw threaded, and provided with appropriate hex openings or the like, as to permit their ready insertion into operative position. Below the cam 104 a stem seal plug generally indicated at 112 is positioned, and O-rings and lubricant multi-purpose greases are inserted in and contained at 112 between the interior of the valve body and the exterior of the seal plug. O-rings and appropriate lubricant are also interposed at 116 between the exterior of stem 88 and the interior of stem seal plug 112.

A cap member generally designated 118 includes a top closure and depending skirt 120 which mounts around and over the upper portion of the stem below the indicator pointer or indicator arm 94. The lower end of the depending skirt is provided with an outwardly extending flange portion 122 adapted to engage with the upper end of the valve body as shown in FIG. 2 and cap screws 124 operatively connect the cap over and to the valve body. A position indicator plate 126 is mounted atop by means of the screws 124. An O-ring and lubricant is interposed at 128 between the cap and the exterior of the stem.

A compression spring 130 is operatively interposed and engaged between the interior or under surface of the cap 118 and the upper surface of the drive cam means or member 104. Functionally this spring will apply a downward pressure or force on the plug through the stem assembly. The spring will apply a force on the plug which opposes the force created by the liquid pressure on the inlet end of the plug. It is to be noted that the cam pins which engage the barrel cam, being threaded, can also be used to lock the stem in any desired set rotary position.

Another feature of the valve resides in a dampening arrangement. Under high vibrational environment, and high inlet pressures, a resultant combined effect can cause the valve to go to the full open position. In order to prevent this, diametrically opposed dampener members, plugs generally 131, in FIG. 2 which include two slotted headless set screws 131a which extend in threaded holes into the valve body at 90° spacings from the cam pins 108, and operatively engage brake pads 131b which are separate Acetal or the like plugs. These plugs frictionally engage the circumferential surface of the drive cam intermediate the positions of the cam pins 108 which engage the inner circumferential surface of the drive cam. The drag on the cam prevents rotation due to vibration induced forces and internal liquid pressure.

Functionally speaking, the above described valve structure generally, through the use of the double groove drive cam means permits and causes a travel of the thread upon the turning of the knob and permits fully opening or closing the valve in less than a 360° turn of the control knob. In other words, this permits setting the ratio of the mix of materials from zero to the maximum attainable within less than one full term of 360° circle of movement of the handle.

The cap member 118, being attached to the valve body by screws 124, which also serve to hold down or fix the indicia plate 126, can be removed from its coacting position on the valve body and as is readily understandable this permits the entire inner functioning portions of the valve including the stem, cam, spring, and plug body, to be withdrawn from the interior of the valve body. This, as pointed out hereinbefore permits easy replacement of members or portions of the plug to either remedy damage, or to utilize different modified plug shapes and configurations. In other words, the whole plug assembly is readily removable from the valve body.

Figure 4:
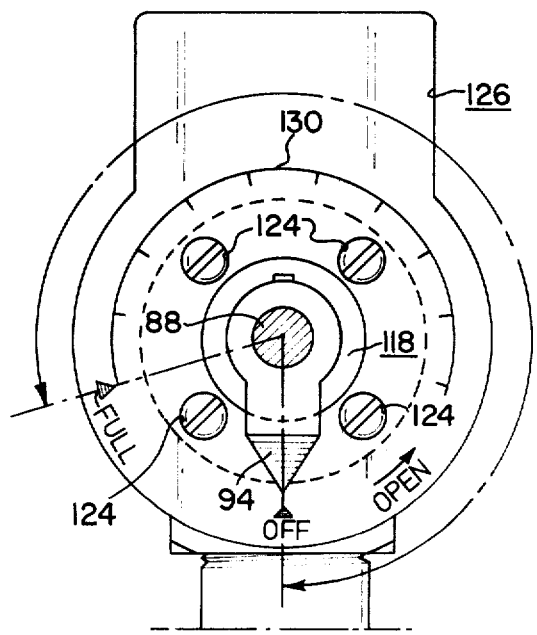
FIG. 4 is a transverse sectional view taken on line 4—4 of FIG. 2 showing details of the indicia plate.

Referring now to FIGS. 2 and 4, the indicator plate includes a plurality of position indicating indicia such as at 130, and this is directly indicative of functional positional engagement between the plug body 98 and the valve seat 100. Other indicia can include the operational direction to function the valve, and the off position or the like. The indicia on the indicator plate are used to disclose the ratio of the two liquids to be mixed, and permits a positive setting of this desired feature or result.

Figure 6:
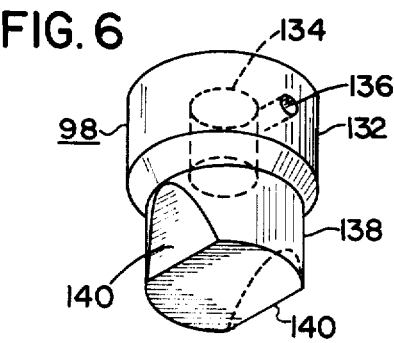
FIG. 6 is a perspective view of a valve plug as used in the illustrated embodiment.
Figure 7:
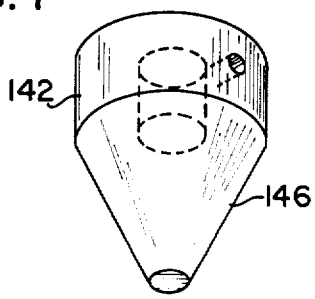
FIG. 7 is a perspective view of another form of plug that can be used in the above illustrated embodiment.

As mentioned hereinbefore, the plug body 98 can be varied. Two possible configurations are shown in FIGS. 6 and 7. The configuration shown in FIG. 6 includes an upper cylindrical portion at 132 with the opening 134 into which the lower end of the stem is engaged and a side opening 136 into which retaining pin 102 is placed for operatively interengaging these portions. The lower end of the plug body includes different configured portions. Generally this lower end indicated at 138 is of a conical configuration and in the embodiment shown in FIGS. 3 and 6 includes flat areas 140 which in effect and operation form a wedge configuration. The configuration as disclosed in FIG. 7 likewise includes an upper end 142 of generally cylindrical configuration adapted for an attachment to the lower end of the stem and the lower end 146 is of a general cone shape, the specific showing being a 30° cone. The exterior surfaces could be otherwise treated to provide flat surfaces thereon similar to the other embodiment.

It is to be noted that the configuration of this plug can be of conical or wedge shape and the wedge angle, provided by the flat surfaces for example, can be so angularly changed as to change the capacity of discharge between for example 30 gallons per minute to 60 gallons per minute or other desired operating regions. The configuration of the plug body controls the net flow area through the valve. If a wedge shape is used the rate change of flow area per unit lift can be decreased at low flows to provide better flow control at lower flows.

Functionally, one of the requirements of the proportioning valve is to accurately control flow at various percentages of a given flow. For example, a valve proportioning in the range of 0 to 250 gpm (system flow) must proportion accurately at, for example, 3% of 7.5 gpm and 10% or 25 gpm. A valve having a maximum flow of 30 gpm can more accurately control flow at 7.5 gpm than a valve having a maximum flow of 60 gpm.

Therefore, one of the main design features of the valve is the ability to be able to selectively design the specific plug configuration to give optimum accuracy of flow control commensurate with maximum system flow requirements. A conical plug designed for 100 gpm (1000 gpm system flow at 10%) maximum flow will have good accuracy at 3% proportioning (or 30 gpm) but not as good and reliable proportioning at 7.5 gpm (as noted above as required above for 3% at 250 gpm system flow).

In fact, a cone type plug can be unreliable at very low flows due to unstable liquid flow characteristics, related to the ratio of the wetted perimeter to flow area of the plug-to-seat opening. It will be obvious, therefore, that many specific variations in plug shapes can be utilized, depending upon specific desired results and utilizations of the valve in different use areas. The overall valve structure is such that ease of change of the specific plug bodies can be utilized by the user or operator.

Obviously many changes in specifics of the valve can be utilized while remaining within the basic and underlying principles and concepts.

Functionally, the variable proportioning valve will, upon being set to a desired figure, as indicated on the indicator plate, proportion or meter the two liquids at constant preselected percentage, under varying flow conditions. The control position serves to control the control plug coaction with the circular port through which the liquid flows. The flow port has such configuration that relative motion between the plug and the port varies the net flow area, and the specific shape and characteristics are mentioned hereinabove. The plug is provided with a seating surface that in the closed position of the valve contacts the port seat and prevents any flow. At the full open position, or any position thereinbetween, as quickly derived from the use of the double-grooved cam a desired or maximum flow area can be provided. This double-grooved cam which reacts with the two cam pins is operable in either the clockwise or counterclockwise direction to thus lift or lower the plug with respect to the valve seat, and thereby varying the net flow area. The position of the plug relative to the shut off position is indicated by the pointer attached to the valve stem. It is of significance to note that the pointer position on the stem can be rotated with respect to the stem and locked thereon by means of the set screw, thus providing an infinite setting of the pointer to any desired position. The calibration on the indicator plate can be selected for the desired end result to permit a valve to be quickly and accurately set for proper metering and resultant outflow, and reflecting various perimeters such as percentage proportioning, plug lift, gallons per minute flow, number of nozzles utilized, etc.

By means of various plug configurations, including such as cone, double wedge, single wedge, axial slots, etc. the maximum flow through the valve, the rate change of flow, and the preciseness of flow control can be varied to meet an infinite number of flow requirements.

When the valve is mounted with the stem horizontal, the indicator plate is so arranged that it can be mounted in a normal vertical position with the outlet located in any one of four directions, and plate orientation can be changed without removal of the valve or portions thereof from the system.

A reiteration of certain desirable features and characteristics of the valve as above described is thought herein to be useful. Some such features include the fact of possible full opening of the valve from zero flow to maximum flow in less than 360° rotation of the handle, and greater than 300° rotation; the valve is usable in high vibration environments by virtue of the combined spring loaded and the adjustable dampening arrangement on the stem assembly; the unit is lockable in any desired set position; can be used with corrosive liquids; provides readily attainable and repeatable positioning; the positionment of the indicator plate can be desirably varied; all of the interior valve components can be readily removed from the valve body without removal of the body from the system, and thus facilitating interchangeability and repair; valve performance characteristics are alterable by a simple change of the plug element; accurate proportioning and metering by virtue of precision control and indication of liquid flow area or plug position is provided; and the indicator plate showing such indication has high visibility under adverse conditions.

While preferred embodiments have been herein shown and described, manifestly various changes in minor details can be effected without departing from the spirit and the scope of the invention as defined in and limited solely by the appended claims.

I claim:

1. A liquid proportioning valve comprising a hollow open upper end valve body, a removable cap and securement means on said open upper end, said cap having an opening therethrough, a rotatable stem extending through said opening and operably reciprocably mounted in said valve body, said valve body having spaced inlet and outlet openings, a valve plug body attached to the lower end of said stem, a valve seat in said valve body coactable with said valve plug body, grooved barrel cam means on said stem, adjustable pins extending through the valve cap at radially spaced positions therearound, said pins having wedge-shaped inner ends tightly operatively engaged in the groove of said cam means to positively control movement thereof upon rotation of the valve stem, said radial spaced pins serving to positively position said cam means in said valve body and operble upon stem rotation for movement of said cam means and said valve plug body to effect spaced relationship of said valve plug body and said valve seat for opening and closing said valve by withdrawal of said valve plug body from valve seat contact to thereby control flow of liquid through said valve, said cam means being operable for quickly effecting a complete valve opening, a compression spring in said valve body surrounding said stem and engaged between said cam drive means and the underside of said cap, said spring normally maintaining positions of the stem, and therethrough the valve plug body, within the valve body, and adjustable damper plugs inserted through said cap into adjustable frictional engagement with the circumferential outer surface of said cam, said stem cam means and said valve plug body being conjointly removable from within said valve body subsequent to removal of said cap from said valve body.

2. A liquid porportioning valve as claimed in claim 1, an indicia plate mountable on said cap and being removable therefrom subsequent to removal of said cap securement means, an indicator pointer arm adjustably mounted on said stem exterior of said cap and coactable with indicia on said indicia plate to visually indicate the amount of valve opening upon rotation of said stem.

3. A liquid proportioning valve as claimed in claim 1, said plug body having a conical bottom portion for coation with said valve seat.

4. A liquid proportioning valve as claimed in claim 1, wherein the lower portion of said plug body bottom is wedge shaped.

5. A liquid proportioning valve as claimed in claim 1, said valve plug body including an upper cylindrical portion and a lower conical shaped portion, said lower conical shaped portion having flat side faces forming a wedge shaped sector thereon.

* * * * *